(12) United States Patent
Chung et al.

(10) Patent No.: US 11,557,806 B2
(45) Date of Patent: Jan. 17, 2023

(54) BATTERY MODULE

(71) Applicant: SK INNOVATION CO., LTD., Seoul (KR)

(72) Inventors: Gyu Jin Chung, Daejeon (KR); Seok Min Kim, Daejeon (KR); Ji Seok Lee, Daejeon (KR)

(73) Assignee: SK ON CO., LTD., Seoul (KR)

( * ) Notice: Subject to any disclaimer, the term of this patent is extended or adjusted under 35 U.S.C. 154(b) by 114 days.

(21) Appl. No.: 16/848,571

(22) Filed: Apr. 14, 2020

(65) Prior Publication Data

US 2020/0328387 A1    Oct. 15, 2020

(30) Foreign Application Priority Data

Apr. 15, 2019    (KR) .................. 10-2019-0043975

(51) Int. Cl.
| | |
|---|---|
| H01M 4/36 | (2006.01) |
| H01M 4/04 | (2006.01) |
| H01M 4/133 | (2010.01) |
| H01M 4/134 | (2010.01) |
| H01M 4/62 | (2006.01) |
| H01M 4/66 | (2006.01) |
| H01M 10/0525 | (2010.01) |
| H01M 4/02 | (2006.01) |
| H01M 50/20 | (2021.01) |
| H01M 10/6551 | (2014.01) |
| H01M 50/531 | (2021.01) |

(52) U.S. Cl.
CPC ....... *H01M 50/20* (2021.01); *H01M 10/6551* (2015.04); *H01M 50/531* (2021.01)

(58) Field of Classification Search
CPC ................................................. H01M 10/6551
See application file for complete search history.

(56) References Cited

U.S. PATENT DOCUMENTS

| | | | | |
|---|---|---|---|---|
| 2002/0195990 | A1* | 12/2002 | Yang ................... | H01M 50/502 320/107 |
| 2007/0238018 | A1 | 10/2007 | Lee et al. | |
| 2009/0029253 | A1* | 1/2009 | Itou ................... | H01M 10/0525 429/223 |

(Continued)

FOREIGN PATENT DOCUMENTS

| | | |
|---|---|---|
| JP | 2004-047426 A | 2/2004 |
| JP | 2006252855 A * | 9/2006 |

(Continued)

OTHER PUBLICATIONS

Office Action for the Korean Patent Application No. 10-2019-0043975 issued by the Korean intellectual Property Office dated Dec. 24, 2021.

(Continued)

*Primary Examiner* — Matthew T Martin
*Assistant Examiner* — Katharine A Caughron
(74) *Attorney, Agent, or Firm* — IP & T Group LLP

(57) ABSTRACT

A battery module including: a battery stack of battery cells having opposite ends to which a plurality of electrode tabs are connected; end-side bus bar assemblies formed at opposite ends of the battery stack, respectively, and electrically connecting the electrode tabs of the battery cells; and a case accommodating the battery stack and the end-side bus bar assemblies.

16 Claims, 15 Drawing Sheets

(56) References Cited

U.S. PATENT DOCUMENTS

| | | | | |
|---|---|---|---|---|
| 2011/0159350 | A1* | 6/2011 | Ochi | B60L 58/21 |
| | | | | 429/159 |
| 2013/0149579 | A1 | 6/2013 | Park | |
| 2015/0037647 | A1* | 2/2015 | Nguyen | B60L 58/26 |
| | | | | 429/120 |
| 2015/0099146 | A1* | 4/2015 | Kim | H01M 10/625 |
| | | | | 429/53 |
| 2016/0133906 | A1* | 5/2016 | Kedir | H01M 10/48 |
| | | | | 429/90 |
| 2017/0047620 | A1* | 2/2017 | Lee | H01M 50/211 |
| 2018/0342722 | A1 | 11/2018 | Zeng et al. | |
| 2020/0381685 | A1* | 12/2020 | Yanagihara | H01M 50/543 |

FOREIGN PATENT DOCUMENTS

| | | | |
|---|---|---|---|
| KR | 10-2007-0100555 A | | 10/2007 |
| KR | 10-2007-0116295 A | | 12/2007 |
| KR | 10-2011-0062851 A | | 6/2011 |
| KR | 2014072689 A | * | 6/2014 |
| KR | 10-2016-0016502 A | | 2/2016 |
| KR | 10-2016-0094909 A | | 8/2016 |
| KR | 10-2016-0149836 A | | 12/2016 |
| KR | 10-2017-0029283 A | | 3/2017 |
| KR | 10-2017-0035218 A | | 3/2017 |
| KR | 10-2017-0123889 A | | 11/2017 |
| KR | 10-2018-0092412 A | | 8/2018 |
| KR | 10-2018-0137293 A | | 12/2018 |
| WO | WO-2020028278 A2 | * | 2/2020 |

OTHER PUBLICATIONS

Korean Prior Art Search Report for the Korean Patent Application No. 10-2019-0043975 issued by WIPS CO., Ltd. dated Sep. 8, 2021.

* cited by examiner

BATTERY MODULE

CROSS-REFERENCE TO RELATED APPLICATIONS

This application claims priority under 35 U.S.C. § 119 to Korean Patent Application No. 10-2019-0043975, filed on Apr. 15, 2019, in the Korean Intellectual Property Office, the disclosure of which is incorporated herein by reference in its entirety.

TECHNICAL FIELD

The following disclosure relates to a battery module, and more particularly, to a battery module including an ultra-long battery cell having a large width.

BACKGROUND

A secondary battery has been prominent as a power source of an electric vehicle (EV), a hybrid electric vehicle (HEV), and the like, that have been suggested for solving air pollution caused by an existing gasoline vehicle, diesel vehicle, or the like, using fossil fuel. It is required to improve an energy density and diminish a spatial restriction in order to load the secondary battery in a vehicle, and in this regard, a long battery cell, in which an edge between electrode tabs is much longer than an edge where the electrode tabs are positioned, has been suggested. A general battery cell has a width of 300 mm or less. Whereas, the long battery cell has a width of 600 mm, and an ultra-long battery cell is designed to have a width of 600 mm or more.

However, the long battery cell or the ultra-long battery cell has a problem that a cell internal resistance is increased due to a large length between the electrode tabs, which causes an increase in power loss. In addition, since a difference in temperature between regions of the battery cell is large, performance of the battery cell deteriorates and a battery life is reduced, and the ultra-long battery cell may be bent due to its own weight.

Therefore, in order to commercialize the battery module including the ultra-long battery cell, an electrical structure capable of reducing the cell internal resistance, a cooling system capable of resolving a heating problem, an assembling structure capable of improving a structural stability, and the like are required.

SUMMARY

An embodiment of the present invention is directed to providing a battery module structure in which a long battery cell or ultra-long battery cell may be modularized without increasing a battery cell internal resistance.

Another embodiment of the present invention is directed to providing a battery module structure capable of improving cooling efficiency of a long battery cell or ultra-long battery cell and structural stability.

In one general aspect, a battery module includes: battery is cells 100 each having opposite ends to which a plurality of electrode tabs are connected; a battery stack 200 formed by stacking the battery cells 100; end-side bus bar assemblies 300 formed at opposite ends of the battery stack 200, respectively, and connecting the electrode tabs of the battery cells 100 in series; transverse bus bar assemblies 400 each connecting electrode tabs connected to opposite ends of an uppermost battery cell 100 or a lowermost battery cell 100 in the battery stack 200, in parallel; and a case 500 accommodating the battery stack 200, the end-side bus bar assemblies 300, and the transverse bus bar assemblies 400.

The end-side bus bar assembly may include a plurality of end-side bus bars 320 electrically connecting electrode tabs positioned at the same end, and an end-side bus bar plate 310 enclosing the end-side bus bars 320 and coupled to the battery stack 200.

The end-side bus bars 320 may include a first end-side bus bar 321 electrically connecting the electrode tabs positioned at one end of the battery stack 200, and a second end-side bus bar electrically connecting the electrode tabs positioned at the other end of the battery stack 200.

The first end-side bus bar 321 and the second end-side bus bar 322 may each have slits into which the electrode tabs are fitted, respectively.

The transverse bus bar assembly 400 may include a transverse bus bar 420 electrically connecting the electrode tabs, and transverse bus bar plates 410 coupled to the battery stack 200 and accommodating the transverse bus bar 420.

The transverse bus bar plate 410 may include a transverse bus bar accommodating groove 412 in which the transverse bus bar 420 is accommodated, and a protruding bead 411 formed at an edge of the transverse bus bar accommodating groove 412 and absorbing an external impact.

The transverse bus bar 420 may include electrode tab connection portions 421 coupled to the electrode tabs, respectively, and a transverse connection portion 422 electrically connecting a pair of electrode tab connection portions 421.

The end-side bus bar assembly 300 may connect the plurality of electrode tabs positioned at one end or the other end of the battery stack 200 in series, and the transverse bus bar assembly 400 may connect a pair of electrode tabs connected in series by the end-side bus bar assembly 300, in parallel.

The end-side bus bar assembly 300 may electrically connect electrode tabs with the same polarity positioned at one end and the other end of the end-side bus bar assembly 300, respectively.

The transverse bus bar assemblies 400 disposed on a top portion and a bottom portion of the battery stack 200 may electrically connect electrode tabs with opposite polarities.

The battery stack 200 may further include heat radiation plates 210 accommodating the battery cells 100.

The heat radiation plate 210 may include upper and lower connection portions 214 for coupling adjacent heat radiation plates 210 in a case where the heat radiation plates 210 are stacked in a state in which the battery cells 100 are accommodated.

The battery module may further include a buffer pad 230 provided between the battery cells 100 facing each other when the heat radiation plates 210 are stacked.

The heat radiation plate 210 may further include an adhesive 220 provided on contact surfaces, the contact surfaces being in contact with the accommodated battery cells 100, respectively.

A side assembling groove 213 into which a protrusion formed on the case 500 is inserted may be formed in an outer side surface of the heat radiation plate 210 that faces the case 500.

The case may include terminal plates 511 each including an output electrode tab electrically connected to the end-side bus bar assembly 300.

The case 500 may further include end-side case covers 1510 each enclosing the terminal plate 511 and each having an opening portion through which the output electrode tab passes.

The case 500 may include side case covers 520 coupled to side surfaces of the battery stack 200, and cooling plates 540 coupled to the side case covers 520, respectively, and forming cooling passages, respectively.

The side case cover 520 may include a side protrusion portion 521 inserted into a groove formed in the end-side bus bar assembly 300.

The case 500 may include upper and lower case covers 530 coupled to an upper surface of the transverse bus bar assembly 400 coupled to an upper end of the battery stack 200 and a lower surface of the transverse bus bar assembly 400 coupled to a lower end of the battery stack 200, respectively.

A curved portion 130 may be formed in the electrode tab coupled to the battery cell 100.

Other features and aspects will be apparent from the following detailed description, the drawings, and the claims.

DETAILED DESCRIPTION OF MAIN ELEMENTS

Figure 1:
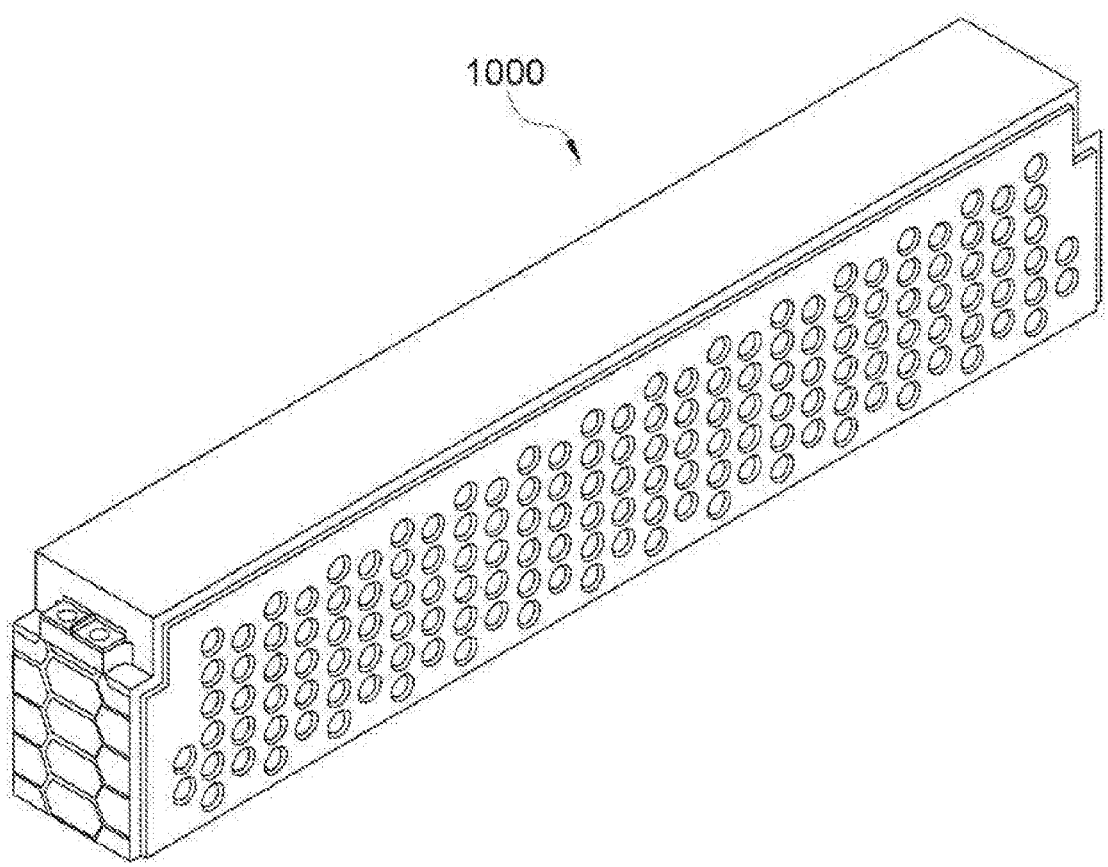
FIG. 1 is a perspective view illustrating a battery module according to the present invention.

100: Battery cell
110: Positive electrode tab
120: Negative electrode tab
130: Curved portion
200: Battery stack
210: Heat radiation plate
213: Side assembling groove
214: Upper and lower connection portion
220: Adhesive
230: Buffer pad
300: End-side bus bar assembly
310: End-side bus bar plate
320: End-side bus bar
400: Transverse bus bar assembly
410: Transverse bus bar plate
420: Transverse bus bar
500: Case
521: Side protrusion portion
540: Cooling plate

DETAILED DESCRIPTION OF EMBODIMENTS

Various advantages and features of exemplary embodiments of the present invention and methods accomplishing them will become apparent from the following description of the exemplary embodiments with reference to the accompanying drawings. However, the present invention is not limited to the exemplary embodiments to be described below, but may be implemented in various different forms, these exemplary embodiments will be provided only in order to make the present invention complete and allow those skilled in the art to completely recognize the scope of the present invention, and the present invention will be defined by the scope of the claims. Throughout the specification, like reference numerals denote like elements.

Hereinafter, in describing the exemplary embodiments of the present invention, when it is decided that a detailed description for the known functions or components may unnecessarily obscure the gist of the present invention, detailed description will be omitted. Further, the following terminologies are defined in consideration of the functions in the exemplary embodiments of the present invention and may be construed in different ways by the intention of users and operators. Therefore, these terms should be defined on the basis of the contents throughout the present specification.

Hereinafter, a battery module according to the present invention be described with reference to the accompanying drawings.

Figure 2:
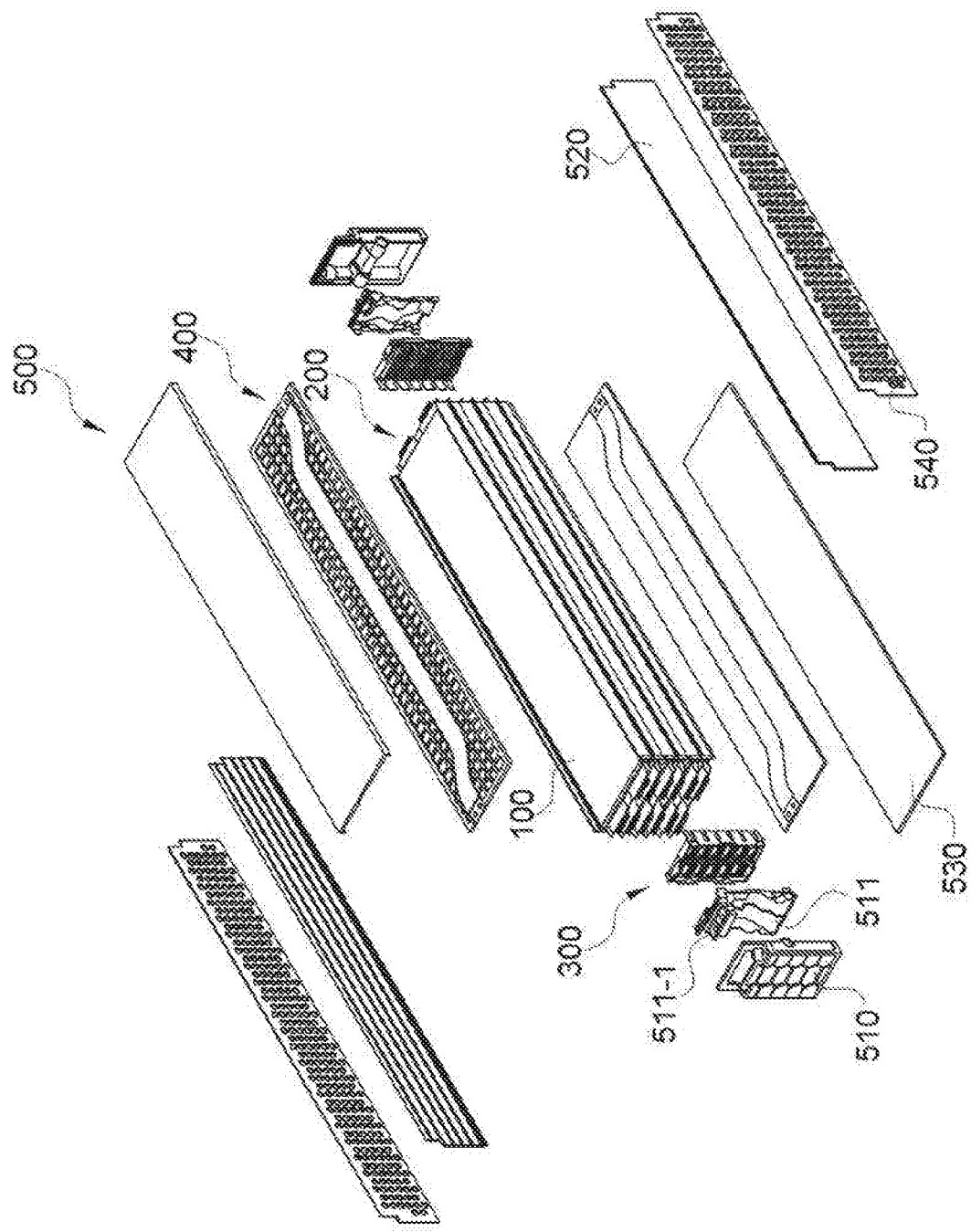
FIG. 2 is an exploded perspective view illustrating the battery module according to the present invention.

FIG. 1 is a perspective view illustrating a battery module 1000 including a long battery cell or ultra-long battery cell according to the present invention, and FIG. 2 is an exploded perspective view illustrating the battery module 1000 according to the present invention.

Referring to FIGS. 1 and 2, the battery module 1000 according to the present invention includes a battery stack 200 formed by stacking battery cells 100, bus bar assemblies electrically connecting the battery cells 100 forming the battery stack 200, and a case 500 accommodating and protecting the battery stack 200 and the bus bar assemblies 300 and 400. The bus bar assemblies include end-side bus bar assemblies 300 formed at opposite ends of the battery stack 200 and electrically connecting electrode tabs of the plurality of battery cells 100, and transverse bus bar assemblies 400 each electrically connecting electrode tabs connected to opposite ends of the uppermost battery cell 100 or the lowermost battery cell 100 in the battery stack 200. Here, the case 500 may include terminal plates 511 electrically connected to the end-side bus bar assemblies 300, respectively, and each including an output electrode tab exposed to the outside, end-side case covers 510 coupled to the terminal plates 511, respectively and each having an opening port on through which the output electrode tab passes, side case covers 520 coupled to surfaces of the battery stack 200, respectively, cooling plates 540 coupled to the side case covers 520, respectively and forming cooling passage, and upper and lower case covers 530 coupled to an upper surface of the transverse bus bar assembly 400 coupled to an upper end of the battery stack 200 and a lower surface of the transverse bus bar assembly 400 coupled to a lower end of the battery stack 200, respectively.

Specifically, the end-side bus bar assemblies 300 are coupled to one end and the other end of the battery stack 200, and the transverse bus bar assemblies 400 are coupled to an upper side and a lower side of the battery stack 200, such that a pair of electrode tabs formed at opposite ends of a battery cell 100 are electrically connected to each other. Output terminals 511-1 of the terminal plates 511 coupled to the end-side bus bar assemblies 300, respectively, are electrically connected to the transverse bus bar assemblies 400 to allow a user to use power of the battery module through the output terminals 511-1. Then, the end-side case covers 510 are coupled to outer surfaces of the terminal plates 511, respectively, the side case covers 520 are coupled to the side surfaces of the battery stack 200, respectively, and the upper and lower case covers 530 are coupled to the upper surface of the transverse bus bar assembly 400 coupled to the upper end of the battery stack 200 and the lower surface of the transverse bus bar assembly 400 coupled to the lower end of the battery stack 200, respectively, to protect the respective components electrically connected to each other, and the cooling plates 540 are coupled to the side case covers 520, respectively, to cool the battery cells 100 positioned inside the case 500.

Figure 3:
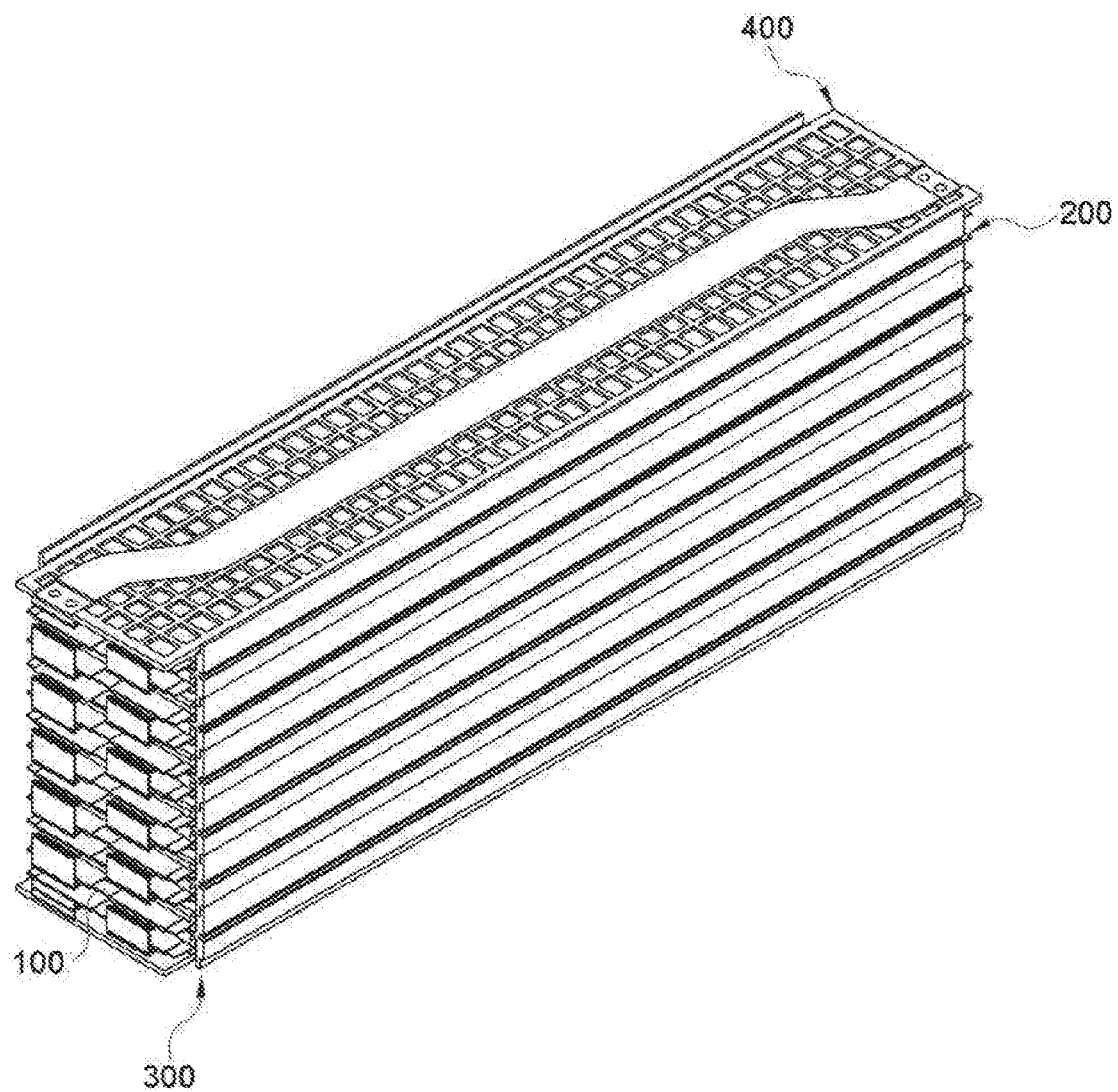
FIG. 3 is a perspective view illustrating a state in which bus, bar assemblies are connected to a battery stack according to the present invention.
Figure 4:
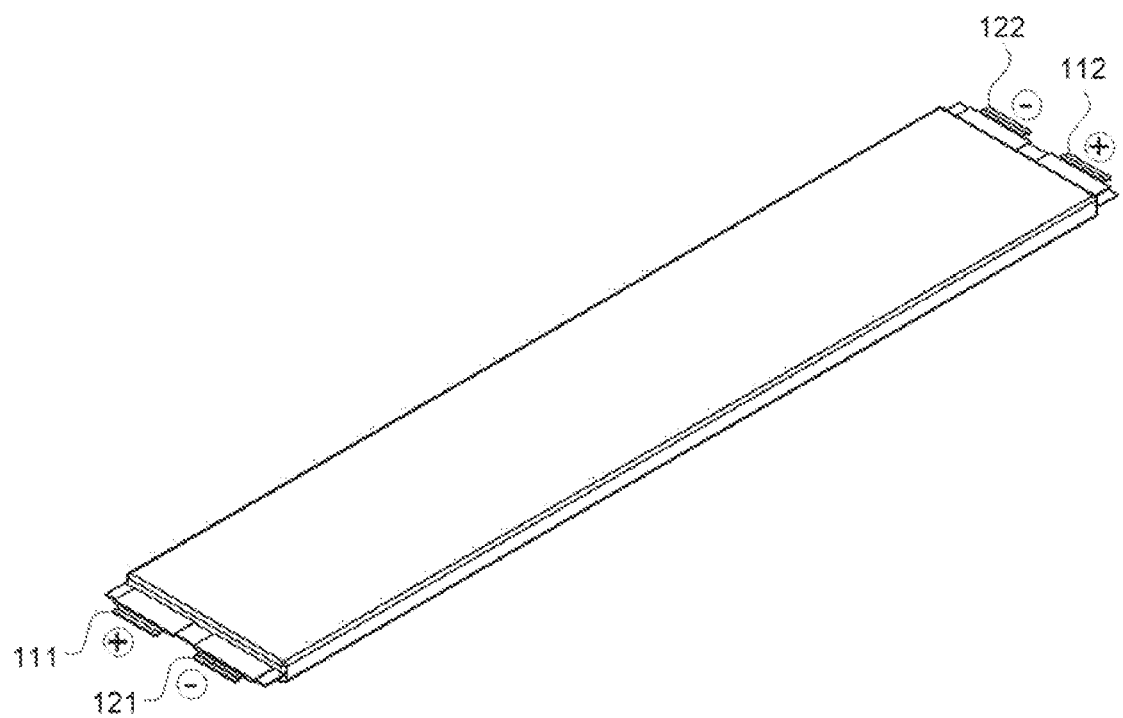
FIG. 4 is a perspective view illustrating a battery cell of the battery module according to the present invention.

FIG. 3 is a perspective view illustrating a state in which the bus bar assemblies are connected to the battery stack according to the present invention, and FIG. 4 is a perspective view illustrating the battery cell 100 forming the battery stack according to the present invention. Referring to FIG. 3, the battery cell 100 according to the present invention is a long battery cell or ultra-long battery cell in which a length of an edge where the electrode tables are positioned is much longer than a length of an edge between the electrode tabs. In the battery module according to the present invention, the end-side bus bar assemblies 300 and the transverse bus bar assemblies 400 are coupled to the battery stack 200, such that the plurality of battery cells 100 are electrically connected to one another. Specifically, in case of a structure in which one electrode tab is formed at each or opposite ends of the battery cell 100, when a width of the battery cell 100 is increased, a length between electrode tabs is increased, such that an internal resistance is increased, which is problematic. Therefore, according to the present invention, a first positive electrode tab 111 and a first negative electrode tab 121 are formed at one end of the battery cell 100 forming the battery stack 200, and a second positive electrode tab 112 and a second negative electrode tab 122 are formed at the other end of the battery cell 100 as illustrated in FIG. 4, such that the positive electrode tab 111 or 112 and the negative electrode tab 121 or 122 are positioned at both ends of the battery cell 100.

Figure 5:
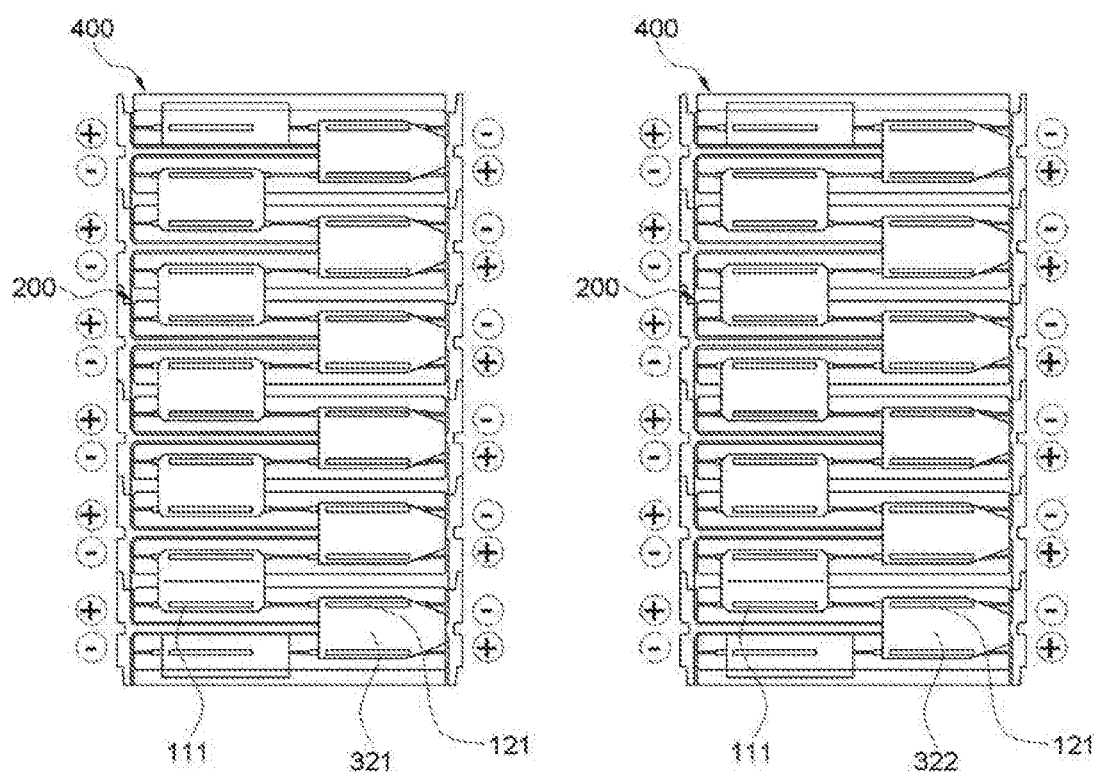
FIG. 5 is a front view and a rear view illustrating a state in which the bus bar assemblies are connected to the battery stack according to the present invention.

Further, since a plurality of battery cells 100 form the battery stack 200, electrode tabs positioned at the same end are connected in series by the end-side bus bar assembly 300 to obtain a higher voltage. The left side of FIG. illustrates a connection state when viewed from the front, in which the first positive electrode tab 111 and the first negative electrode tab 121 positioned at one end of the battery stack 200 are connected in series through a first end-side bus bar 321. The right side of FIG. 5 illustrates a connection state when viewed from behind, in which the second positive electrode tab 121 and the second negative electrode tab 122 positioned at the other end of the battery stack 200 are connected in series through a second end-side bus bar 322. As a result, the user may output a higher voltage through the stacked battery cells 100.

Here, in a case where, among the electrode tabs positioned at one end and the other end of the battery cell 100, only an electrode tab positioned at any one end is activated, a current density in a specific region of the one end at which the activated electrode tab is positioned is increased, such that the specific region of the battery cell 100 which the activated electrode tab is coupled is overheated as compared with other regions, and a surface pressure is increased, and thus dendrites may be formed. Accordingly, in the present invention, it is preferable that an electrode tab positioned at one end and an electrode tab positioned at the other end are connected in parallel through the transverse bus bar assembly 400 as illustrated in FIGS. 3 and 5. Specifically, the first positive electrode tab 11 and the first negative electrode tab 121 are formed at one end of the battery cell 100, and the second positive electrode tab 112 and the second negative electrode tab 122 are arranged in a horizontally reversed manner with respect to the first positive electrode tab 111 and the first negative electrode tab 121, at the other end at the battery cell 100 as illustrated in FIG. 4. Therefore, the transverse bus bar assembly 400 coupled to the upper end of the battery stack 200 as illustrated in FIG. 5 electrically connects the first positive electrode tab 111 and the second positive electrode tab 112, or the first negative electrode tab 121 and the second negative electrode tab 122, and the transverse bus bar assembly 400 coupled to the lower end of the battery stack 200 connects electrode tabs with opposite polarities, such that electrode tabs positioned at different ends and connected in series through the end-side bus bar assembly 300 are connected in parallel.

The transverse bus bar assembly 400 connecting electrode tabs positioned at different ends in parallel is electrically connected to the output electrode tabs of the term anal plates 511 coupled as described above, and all electrode tabs positioned at one end and the other end of the battery cell 100 are activated when the user uses the output electrode tabs. Therefore, an uneven temperature distribution phenomenon due to an increase in a current density caused when only an electrode tab coupled to any one end is activated may be significantly reduced and formation of the dendrites may be prevented. Further, it is a matter of course that the transverse bus bar assembly 400 coupled to a top portion of the battery stack 200 and the transverse bus bar assembly 400 coupled to a bottom portion of the battery stack 200 may be connected through the first end-side bus bar 321 and the second end-side bus bar 322 as illustrated in FIG. 5.

Figure 6:
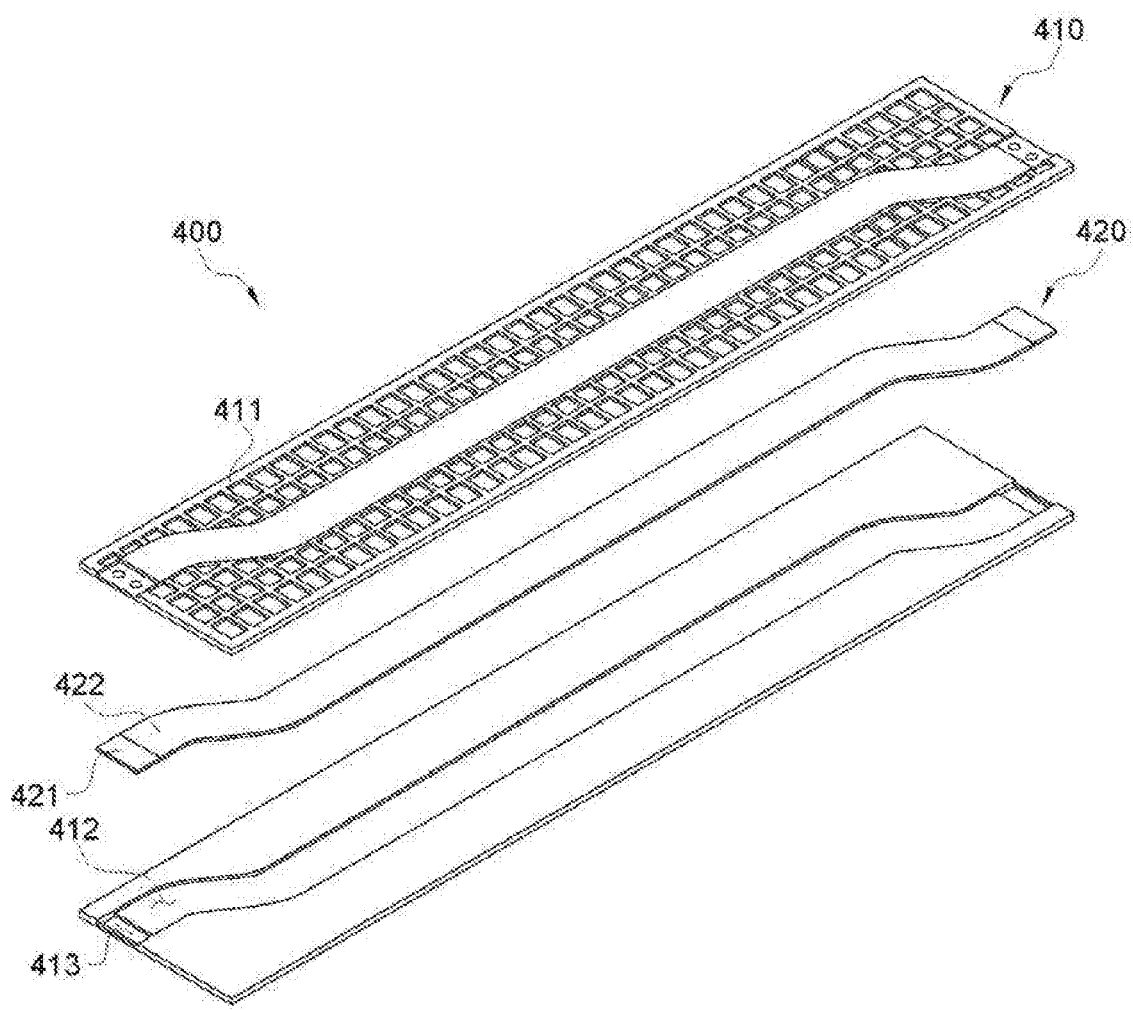
FIG. 6 is an exploded perspective view illustrating a transverse bus bar assembly of the battery module according to the present invention.

FIG. 6 is an exploded perspective view illustrating the transverse bus bar assembly of the battery module according to the present invention.

Referring to FIG. 6, the transverse bus bar assembly 400 may include a transverse bus bar 420 electrically connecting electrode tabs, and transverse bus bar plates 410 coupled to the battery stack 200 and accommodating the transverse bus bar 420. Specifically, in a case where the transverse bus bar 420 is exposed to the outside, the transverse bus bar 420 may be damaged by an external impact. Therefore, according to the present invention, the transverse bus bar plates 410 enclose the transverse bus bar 420 to protect the transverse bus bar 420.

Further, the transverse bus bar plate 410 may include a transverse bus bar accommodating groove 412 in which the transverse bus bar 420 is accommodated, and a protruding bead 411 formed at an edge of the transverse bus bar accommodating groove 412 to increase exterior rigidity and absorb an impact. The transverse bus bar 420 may include electrode tab connection portions 421 coupled to the electrode tabs, respectively, and a transverse connection portion 422 electrically connecting a pain of electrode tab connection portions 421. Specifically, the transverse bus bar accommodating groove 412 in which the transverse connection portion 422 is accommodated is formed. In an inner surface of at least one of the transverse bus bar plates 410 divided into an upper transverse bus bar plate and a lower transverse bus bar plate. When the upper transverse bus bar plate and the lower transverse bus bar plate are coupled to each other in a state in which the transverse connection portion 422 is inserted into the transverse bus bar accommodating groove 412, the transverse bus bar plates 410 enclose the transverse connection portion 422 to protect the transverse connection portion 422 from an external impact. The electrode tab connection portions 421 formed at opposite end portions of the transverse connection portion 422 in a length direction are each positioned on tab exposing holes 413 formed in the lower transverse bus bar plate 410, respectively, and are each connected to the first end-side bus bar 321 or the second end-side bus bar 322 into which electrode tabs of neighboring battery cells 100 are fitted when the transverse bus bar assemblies 400 are coupled to the upper side and the lower side of the battery stack 200, respectively.

Here, the transverse bus bar plate 410 may include the protruding bead 411 formed at the edge of the transverse bus bar accommodating groove 412 to more effectively protect the accommodated transverse bus bar 420, and the protruding bead 411 may have a lattice-shaped structure to increase an external impact absorption rate.

Figure 7:
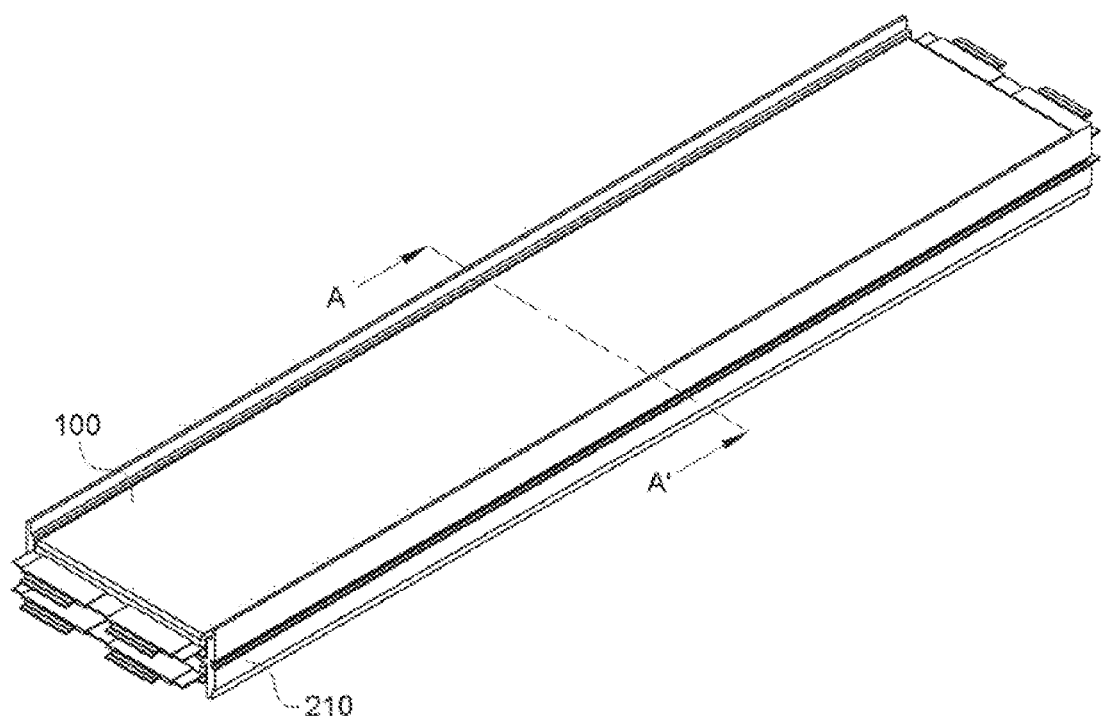
FIG. 7 is a perspective view illustrating a state in which a pair of battery cells according to the present invention is coupled to a heat radiation plate.
Figure 8:
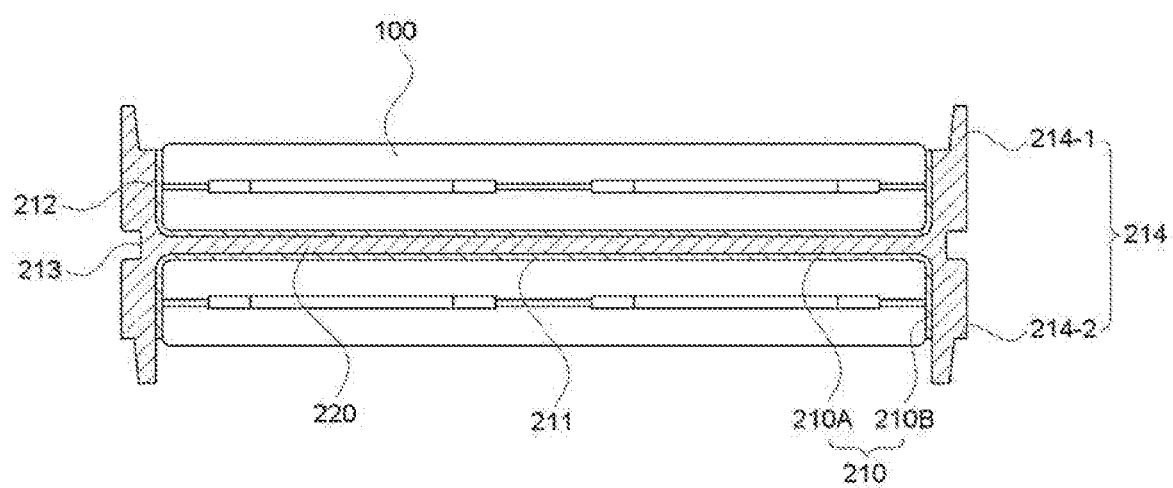
FIG. 8 is a cross-sectional view taken along line A-A' illustrating the state in which the pair of battery cells according to the present invention is coupled to the heat radiation plate.

FIG. 7 is a perspective view illustrating a state in which a pair of battery cells according to the present invention is coupled to a heat radiation plate, and FIG. 8 is a cross-sectional view of FIG. 7.

Referring to FIG. 7, the battery module according to the present invention may further include a heat radiation plate 210 accommodating the battery cells 100 at an upper side and a lower side of the heat radiation 210, respectively. Specifically, since performance of the battery cell 100 deteriorates and the battery life is reduced in a case where a temperature is increased to a certain point or higher, the heat radiation plate 210 having an "H"-letter shaped cross-sectional structure is positioned between the battery cells 100 to facilitate cooling of the battery cell 100.

Here, the heat radiation plate 210 may include a central heat radiation plate 210A which is in contact with an upper surface or a lower surface of each of the battery cells 100 positioned on the upper side and the lower side of the heat radiation plate 210, and edge heat radiation plates 210B which surround side surfaces of the battery cells 100 as illustrated in FIG. 8. Further, heat generated from the battery cell 100 may be more efficiently transferred to the heat radiation plate 210 and then radiated to the outside by providing an adhesive 220 on a first contact surface 211 of the central heat radiation plate 210A that is in contact with the battery cell 100, and a second contact surface 212 of the edge heat radiation plate 210B that is in contact with the battery cell 100.

Upper and lower connection portion 214 for coupling, in a case where a plurality of heat radiation plates 210 are stacked, the heat radiation plate 210 to a heat radiation plate 210 positioned thereon and a heat radiation plate 210 positioned thereunder may be formed at an upper end portion and a lower end portion of the edge heat radiation plate 210B, respectively. An side assembling groove 213 into which protrusion of the case 500 is inserted may be formed in a side surface of each of the edge heat radiation plates 210B. Detailed structures of the side assembling groove 213 and the Upper and lower connection portion 214 will be described in more detail later.

Figure 9:
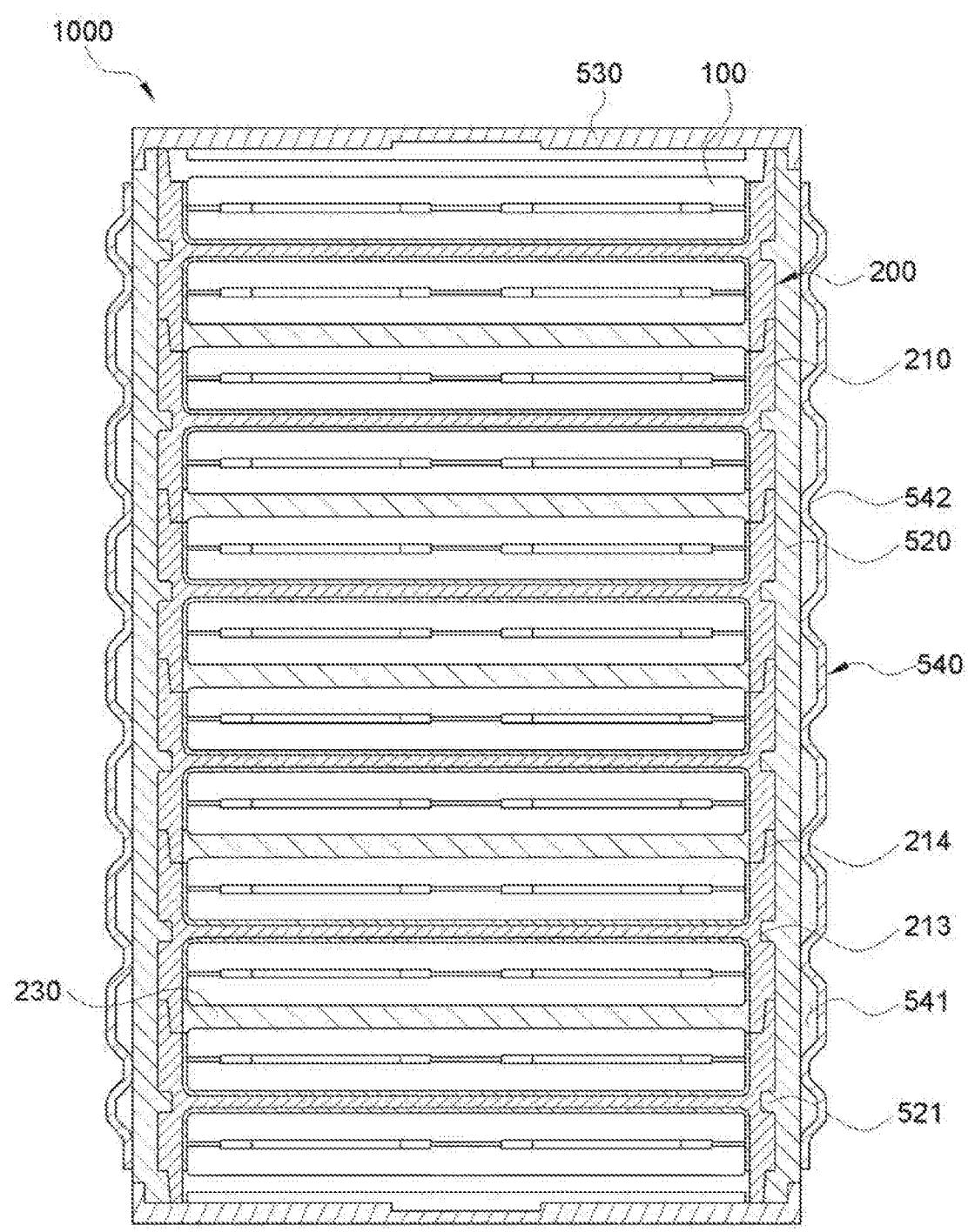
FIG. 9 is a cross-sectional view illustrating the battery module according to the present invention.

FIG. 9 is a cross-sectional view of the battery module according to the present invention. Referring to FIG. 9, in the battery module 1000, the battery stack 200 may be formed by accommodating the battery cells 100 at the upper side and the lower side of each of the heat radiation plates 210, respectively, and then vertically stacking the heat radiation plates 210. The side case covers 520 may be coupled to the side surfaces of the battery stack 200, and then the upper and lower case covers 530 are coupled to the side case covers 520 to enclose and protect the battery stack 200. In addition, the cooling plates 540 are coupled to the side case covers 520, respectively, such that a coolant or a refrigerant may flow close to the side case covers 520.

Specifically, the Upper and lower connection portion 214 of the heat radiation plate 210 include a coupling protrusion 214-1 and a coupling groove 214-2 into which the coupling protrusion 214-1 is fitted and fixed as illustrated in FIG. 8 and the heat radiation plates 210 are stacked to form one battery stack 200 as illustrated in FIG. 9. In addition, since the battery stack 200 has a structure in which the heat radiation Plates 210 are stacked and the stacked heat radiation plates 210 may be uncoupled at the time of vertical movement, the side assembling groove 213 is formed in an outer side surface of the heat radiation plate 210, a side protrusion portion 521 fitted into the side assembling groove 213 is formed the side case cover 520, and the side protrusion portion 521 is fitted into the side assembling groove 213, thereby restricting the vertical movement of the heat radiation plate 210. In addition, as the side protrusion portion 521 is fitted into the side assembling groove 213, a contact area between the heat radiation plate 210 and the side case cover 520 is increased, and thus heat of the battery cell 100 is more effectively transferred to the side case cover 520 through the heat radiation plate 210. The heat transferred to the side case cover 520 is absorbed by a coolant or refrigerant flowing through a cooling passage 541 formed by the cooling plate 540 coupled to the side case cover 520 and having a concave-convex cross-sectional shape.

Here, the cooling passage 541 is formed on the cooling plate 540, and is formed by a plurality of pattern protrusions 542 protruding inwardly to face the side case cover 520. Since a cross-sectional area and a shape of the cooling passage 541 are changed depending on a shape and arrangement of the pattern protrusion 542, it is possible to allow the coolant or refrigerant passing through the cooling passage 541 to form a vortex at a specific region by adjusting the shape or arrangement of the pattern protrusion 542. Specifically, in a case where the cooling passage 541 has a linear structure, a time for which the coolant or refrigerant remains in the cooling passage 541 is reduced, and thus heat exchange efficiency may be reduced. Therefore, according to the present invention, the cooling passage 541 has a curved structure with the pattern protrusion 542, such that the coolant or refrigerant passing through the cooling passage 541 may hit the pattern protrusion 542 and form a vortex. Further, the shape and arrangement of pattern protrusion 542 for allowing the coolant or refrigerant passing through the cooling passage 541 to form a vortex may vary.

According to an exemplary embodiment, a pattern protrusion arranged on one end of the cool plate 540 and a pattern protrusion adjacent thereto may be misaligned in a vertical direction to allow the coolant or refrigerant passing through the cooling passage 541 to hit the pattern protrusions 542 and form a vortex.

Further, when the battery stack. 200 is formed by stacking the heat radiation plates 210, an empty space may be formed between battery cells 100 accommodated in different heat radiation plates 210, respectively. In such an empty space, buffer pad. 230 for preventing the battery cell 100 from escaping from the heat radiation plate 210 or preventing the battery cells 100 from colliding with each other may be provided.

Figure 10:
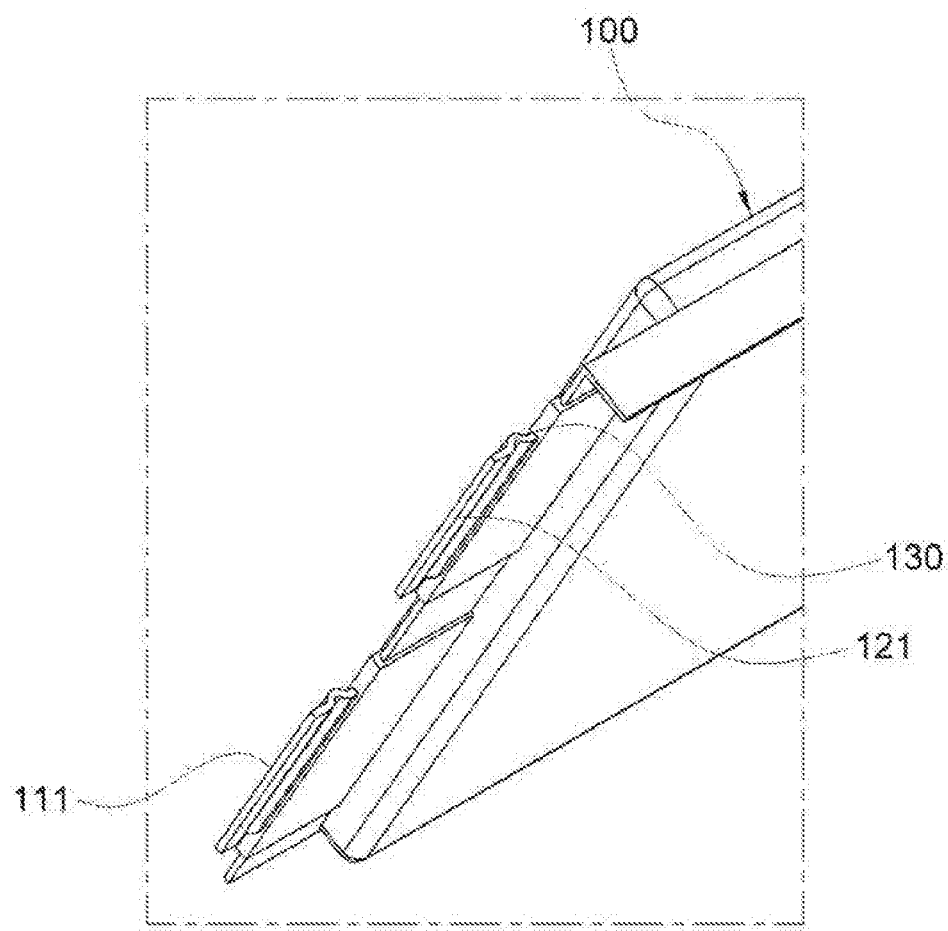
FIG. 10 is a partially enlarged view illustrating an end portion of the battery cell of the battery module according to the present invention.
Figure 11:
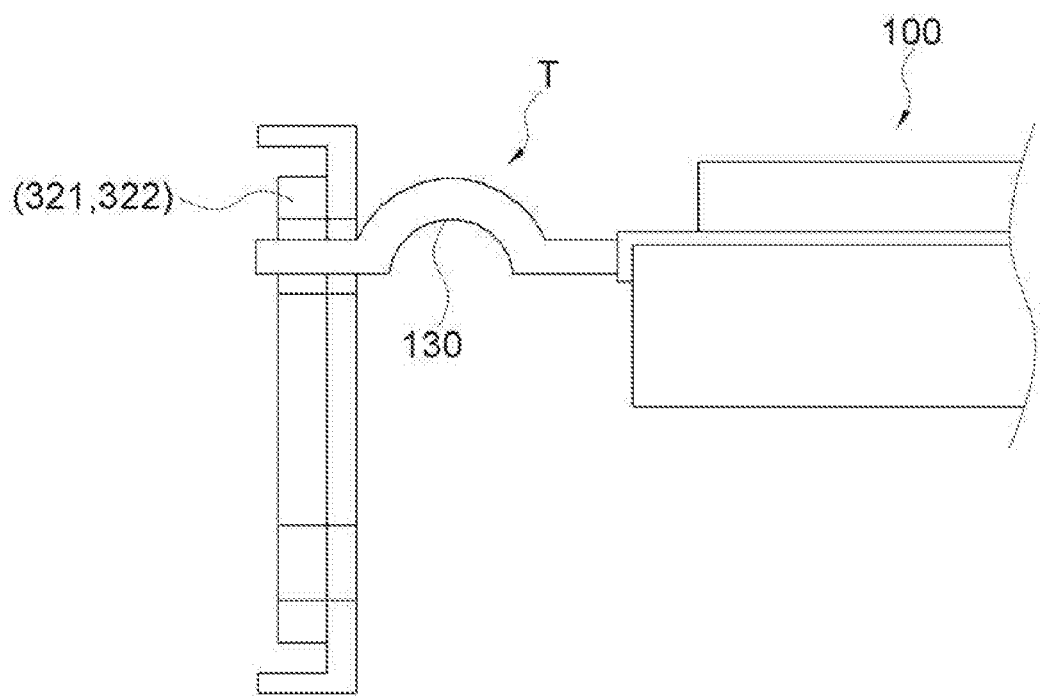
FIGS. 11 and 12 are each a conceptual view illustrating a coupling structure of an electrode tab and an end-side bus bar of the battery module according to the present invention.
Figure 12:
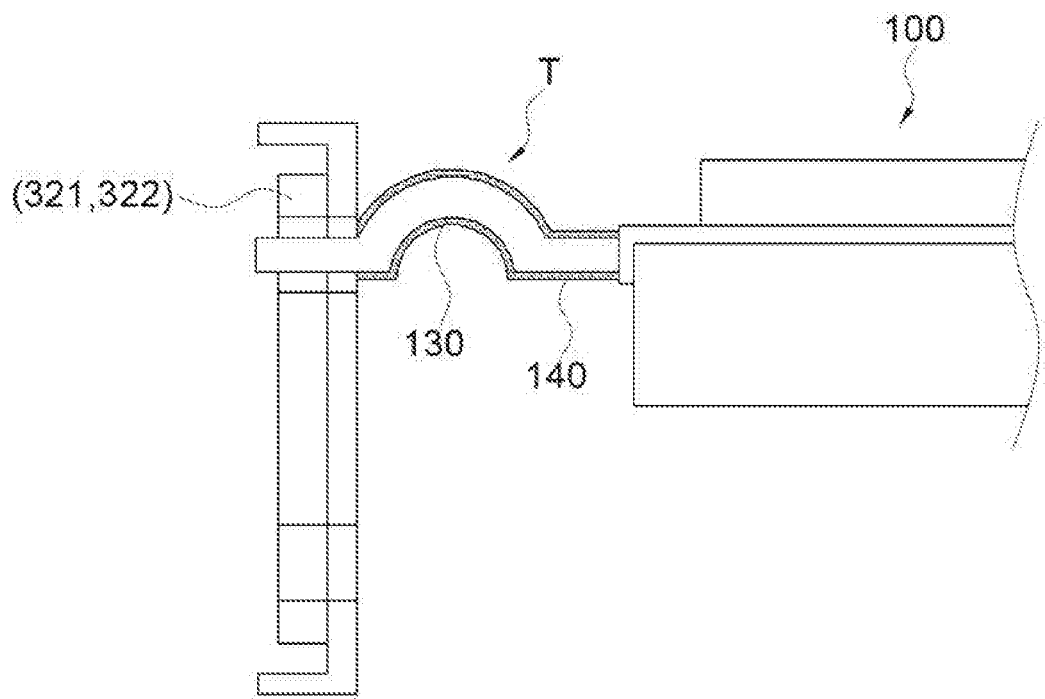

FIG. 10 is a partially enlarged view of the battery cell of the battery module according to the present invention, and FIGS. 11 and 12 are each a conceptual view illustrating a coupling structure of the electrode tab and the end-side bus bar. Referring to FIG. 10, it is preferable that a curved portion 130 is formed in the electrode tab coupled to the battery cell 100. Specifically, the first positive electrode tab 111, the second positive electrode tab 112, the first negative electrode tab 121, and the second negative electrode tab 122 are formed in the battery cell 100 as illustrated in FIG. 4, and the electrode tabs T are fitted into slits formed in the first end-side bus bar 321 or the second end-side bus bar 322 and then welded to the first end-side bus bar 321 or the second end-side bus bar 322 as illustrated in FIG. 11. The curved portion 130 is formed in the electrode tab T to absorb an external vibration impact, thereby significantly reducing a damage to the coupling between the electrode tab T and the end-side bus bar, or a damage to the electrode tab T. Here, when the electrode tab T is inserted into the slit formed in the end-side bus bar as illustrated in FIG. 11, the end-side bus bar is seated on the curved portion 130, and thus the curved portion 130 may be used to facilitate the welding. In addition, when the electrode tab T and the end-side bus bar 321 or 322 is welded by using a laser, the curved portion 130 may prevent the laser passing through the slit formed in the end-side bus bar from being directly irradiated to the battery cell 100. The battery cell 100 may further include a sealant portion 140 which seals a position where the electrode tab is led out and encloses a connection portion of the electrode tab T led out from the battery cell 100 to ensure an electrical insulating state. The sealant portion 140 may enclose the curved portion 130 and a region between the curved portion 130 and an electrode tab lead-out portion, except for an end portion inserted into the slit of the end-side bus bar.

Figure 13:
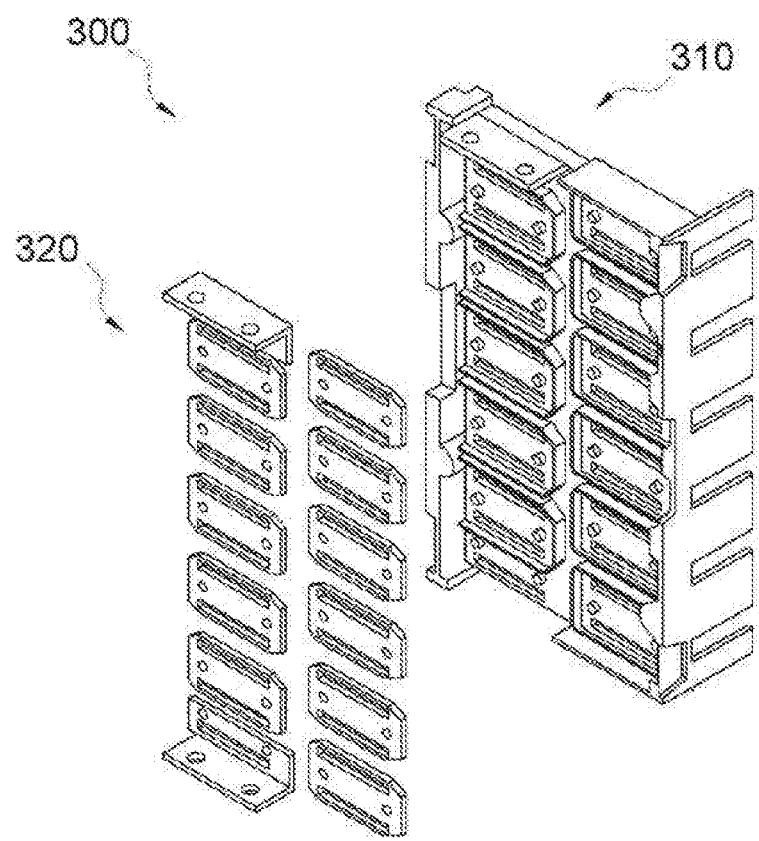
FIG. 13 is an exploded perspective view illustrating an end-side bus bar assembly of the battery module according to the present invention.

FIG. 13 is an exploded perspective view illustrating the end-side bus bar assembly 300 of the battery module according to the present invention. Referring to FIG. 13, the end-side bus bar assembly 300 may include an end-side bus bar plate 310 coupled to the battery stack 200, and end-side bus bars 320 coupled to the end-side bus bar plate 310 and connecting the positive electrode tab and the negative electrode tab in series or in parallel as described above. Specifically, the end-side bus bar plate 310 encloses the end-side bus bars 320 to prevent the end-side bus bars 320 from being exposed to the outside.

Figure 14:
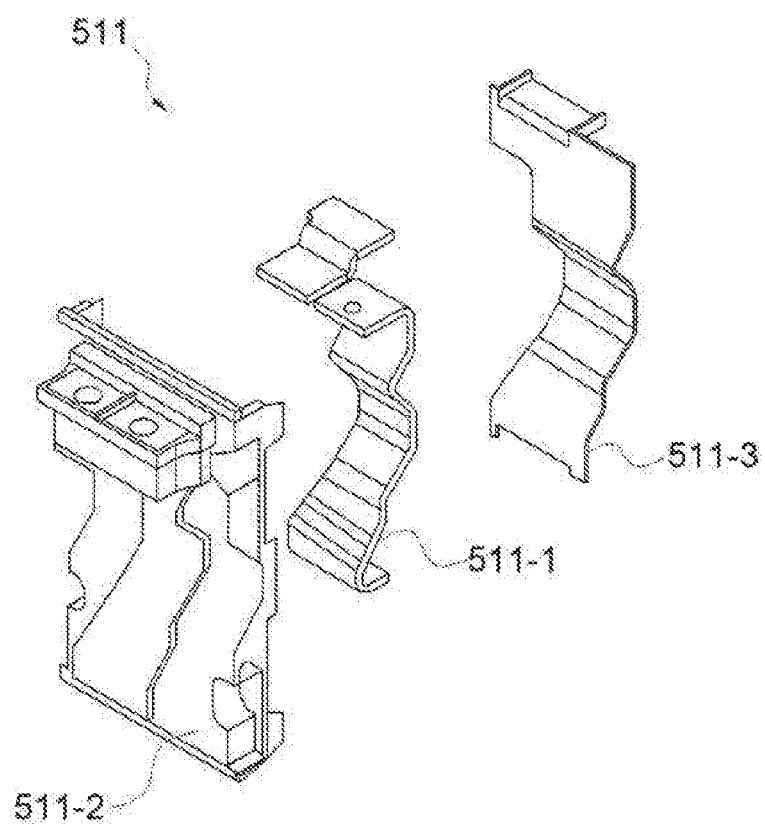
FIG. 14 is an exploded perspective view illustrating a terminal plate of the battery module according to the present invention.

FIG. 14 is an exploded perspective view illustrating the terminal plate 511 of the battery module according to the present invention. Referring to FIG. 14, the terminal plate 511 includes an outer protector 511-2 in which an accommodating portion is formed, an output terminal 511-1 fitted into the accommodating portion of the outer protector and electrically connected to the end-side bus bar 320, and an inner protector 511-3 coupling the output terminal 511-1 fitted into the accommodating portion with the outer protector 511-2. Specifically, the outer protector 511-2 and the inner protector 511-3 enclose the output terminal 511-1 electrically connected to the end-side bus bar 320 to prevent a damage caused by an external impact, and significantly decreasing a surface area exposed to the outside, thereby improving an insulating property.

Figure 15:
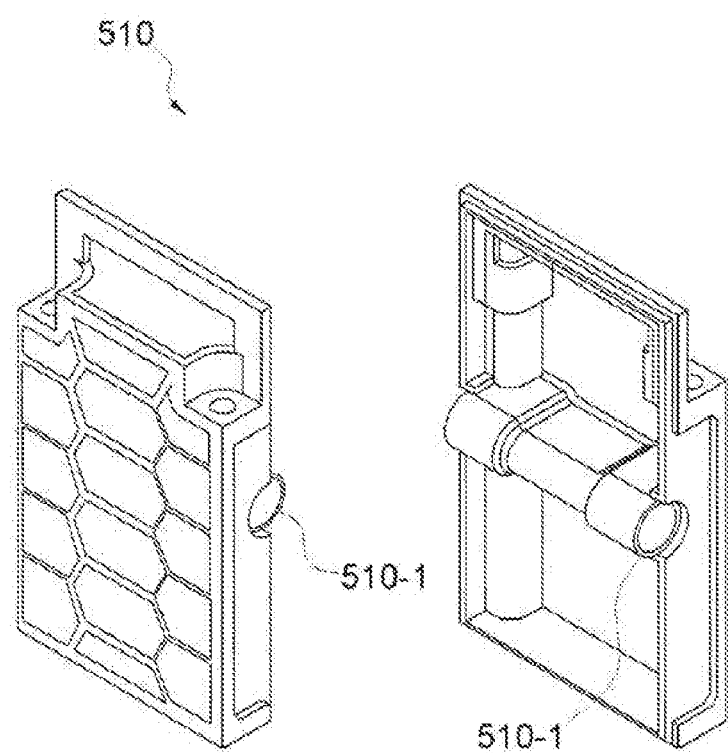
FIG. 15 is a front perspective view and a rear perspective view each illustrating a case cover of the battery module according to the present invention.

FIG. 15 is a perspective view illustrating a pair of end-side case covers 510 coupled to the terminal plates 511, respectively. Referring to FIG. 15, the end-side case cover 510 includes a cooling passage connection portion 510-1 communicating with the cooling passage 541 formed on the cooling plate 540. Specifically, according to the present invention, since the cooling plates 540 are provided on one side surface and the other side surface of the battery stack 200, respectively, and the cooling passages 541 in which the refrigerant or coolant moves are formed on the cooling plates 540, respectively, the cooling passages 541 separate from each other are connected to each other through the cooling passage connection portion 510-1, such that a circulation passage, in which the refrigerant or coolant may move along an edge of the battery module and cool the battery, is formed.

With the above-described configuration, in the battery module according to the present invention, a stable electrical connection may be made without increasing an internal resistance by forming a plurality of electrode tabs at each of opposite ends of the long battery cell or ultra-long battery cell, connecting bus bars positioned at opposite ends of the stacked ultra-long battery cells in series, and connecting the remaining electrode tabs of the uppermost battery cell or lowermost battery cell in parallel through the transverse bus bar assembly.

Further, as a plurality of positive electrode tabs and a plurality of negative electrode tabs are formed in one cell, a direct current internal resistance (DCIR) of the cell may be reduced.

Since the battery cell may be more effectively cooled by using the heat radiation plate and the cooling plate, it is possible to improve the performance of the battery cell and the battery life.

Further, the side case cover and the battery stack are fixed by using the side assembling groove of the heat radiation plate, thereby preventing the ultra-long battery cell from being bent.

The present invention should not be construed to being limited to the above-mentioned exemplary embodiment. The present invention may be applied to various fields and may be variously modified by those skilled in the art without departing from the scope of the present invention claimed in the claims. Therefore, it is obvious to those skilled in the art that these alterations and modifications fall in the scope of the present invention.

What is claimed is:
1. A battery module comprising:
  battery cells each having a plurality of electrode tabs at one end and a plurality of electrode tabs at the other end, totally having two or more positive electrode tabs and two or more negative electrode tabs;
  a battery stack formed by stacking the battery cells;
  end-side bus bar assemblies formed at opposite ends of the battery stack, respectively, and connecting the electrode tabs of the battery cells in series or in parallel;
  transverse bus bar assemblies each electrically connecting electrode tabs of an uppermost battery cell or a lowermost battery cell in the battery stack; and a case accommodating the battery stack, the end-side bus bar assemblies, and the transverse bus bar assemblies;

wherein each of the end-side bus bar assemblies includes a plurality of end-side bus bars electrically connecting the electrode tabs positioned at the same end, and an end-side bus bar plate enclosing the end-side bus bars and coupled to the battery stack, wherein each of the transverse bus bar assemblies includes a transverse bus bar electrically connecting the electrode tabs of the uppermost battery cell or of the lowermost battery cell, respectively, and a transverse bus bar plate coupled to the battery stack and accommodating the transverse bus bar, wherein the transverse bus bar includes electrode tab connection portions coupled to the electrode tabs of the uppermost battery cell or of the lowermost battery cell, respectively, and a transverse connection portion electrically connecting a pair of electrode tab connection portions, wherein the transverse bus bar plate includes a transverse bus bar accommodating groove in which the transverse bus bar is accommodated, and a protruding bead formed at an edge of the transverse bus bar accommodating groove and absorbing an external impact, wherein the transverse connection portion is accommodated in the transverse bus bar accommodating groove of the bus bar plate.

2. The battery module of claim 1, wherein the end-side bus bars include a first end-side bus bar electrically connecting the electrode tabs positioned at one end of the battery stack, and a second end-side bus bar electrically connecting the electrode tabs positioned at the other end of the battery stack.

3. The battery module of claim 2, wherein the first end-side bus bar and the second end-side bus bar each have slits into which the electrode tabs are fitted, respectively.

4. The battery module of claim 1, wherein each end-side bus bar assembly connects the plurality of electrode tabs positioned at one end or the other end of the battery stack in series, and the transverse bus bar assemblies connect a pair of electrode tabs connected in series by one of the end-side busbar assemblies, in parallel.

5. The battery module of claim 4, wherein each end-side bus bar assembly connects electrode tabs with opposite polarities positioned at one end and the other end of each end-side bus bar assembly, respectively, in series, or connects electrode tabs with the same polarity in parallel.

6. The battery module of claim 5, wherein the transverse bus bar assemblies disposed on a top portion and a bottom portion of the battery stack each electrically connect electrode tabs with opposite polarities.

7. The battery module of claim 1, wherein the battery stack further includes heat radiation plates accommodating the battery cells.

8. The battery module of claim 7, wherein the heat radiation plate includes upper and lower connection portions for coupling adjacent heat radiation plates in a case where the heat radiation plates are stacked in a state in which the battery cells are accommodated.

9. The battery module of claim 8, further comprising a buffer pad provided between the battery cells facing each other when the heat radiation plates are stacked.

10. The battery module of claim 7, wherein a side assembling groove into which a protrusion formed on the case is inserted is formed in an outer side surface of the heat radiation plate that faces the case.

11. The battery module of claim 1, wherein the case includes terminal plates each including an output electrode tab electrically connected to the end-side bus bar assembly.

12. The battery module of claim 11, wherein the case further includes end-side case covers each enclosing the terminal plate and each having an opening portion through which the output electrode tab passes.

13. The battery module of claim 1, wherein the case includes side case covers coupled to side surfaces of the battery stack, and cooling plates coupled to the side case covers, respectively, and forming cooling passages, respectively.

14. The battery module of claim 13, wherein the side case cover includes a side protrusion portion inserted into a groove formed in the end-side bus bar assembly.

15. The battery module of claim 1, wherein the case includes upper and lower case covers coupled to an upper surface of the transverse bus bar assemblies coupled to an upper end of the battery stack and a lower surface of the transverse bus bar assemblies coupled to a lower end of the battery stack, respectively.

16. The battery module of claim 1, wherein a curved portion is formed in the electrode tab coupled to the battery cell.

\* \* \* \* \*